(12) United States Patent
Beckley et al.

(10) Patent No.: US 8,546,006 B2
(45) Date of Patent: Oct. 1, 2013

(54) SYSTEM AND METHOD FOR DELIVERING FLUID TO A BATTERY

(75) Inventors: Gordon C. Beckley, Grayson, GA (US); Charles E. Snyder, Placentia, CA (US); Marvin C. Ho, Yorba Linda, CA (US)

(73) Assignee: Trojan Battery Company, Santa Fe Springs, CA (US)

( * ) Notice: Subject to any disclaimer, the term of this patent is extended or adjusted under 35 U.S.C. 154(b) by 276 days.

(21) Appl. No.: 12/877,916

(22) Filed: Sep. 8, 2010

(65) Prior Publication Data

US 2012/0058369 A1    Mar. 8, 2012

(51) Int. Cl.
    *H01M 2/36*    (2006.01)
    *H01M 10/48*   (2006.01)

(52) U.S. Cl.
    USPC .................................. 429/61; 429/50; 429/74

(58) Field of Classification Search
    USPC .......................................... 429/63, 50, 61, 74
    See application file for complete search history.

(56) References Cited

U.S. PATENT DOCUMENTS

| | | | |
|---|---|---|---|
| 4,221,847 A | 9/1980 | Inkmann | |
| 5,665,484 A | 9/1997 | Bolger | |
| 6,106,968 A * | 8/2000 | Johnson et al. | 429/50 |
| 6,189,811 B1 | 2/2001 | Rudy | |
| 6,213,145 B1 | 4/2001 | Crook et al. | |
| 6,622,744 B2 | 9/2003 | Crook et al. | |
| 6,718,996 B2 | 4/2004 | Crook et al. | |
| 6,786,226 B2 | 9/2004 | Crook et al. | |
| 7,104,272 B2 * | 9/2006 | Vassily et al. | 137/1 |
| 2004/0131902 A1 * | 7/2004 | Frank et al. | 429/21 |
| 2005/0001628 A1 * | 1/2005 | Jones et al. | 324/432 |
| 2005/0084745 A1 | 4/2005 | Colello et al. | |
| 2006/0105230 A1 | 5/2006 | Fitter | |
| 2009/0004511 A1 * | 1/2009 | Hlavac | 429/3 |
| 2010/0167109 A1 | 7/2010 | Campau et al. | |

FOREIGN PATENT DOCUMENTS

JP    01076678 A  *  3/1989

OTHER PUBLICATIONS

International Search Report mailed Nov. 7, 2011 for corresponding application No. PCT/US11/41846, 2 pages.

Written Opinion of the International Searching Authority mailed Nov. 7, 2011 for corresponding application No. PCT/US11/41846, 6 pages.

* cited by examiner

*Primary Examiner* — Gregg Cantelmo
(74) *Attorney, Agent, or Firm* — Christie, Parker & Hale, LLP

(57) ABSTRACT

A system for delivering water to a fluid electrolyte battery comprising at least one battery cell. Such a system includes a tank adapted to hold the fluid, a pump adapted to pump the fluid from the tank when the pump is turned on, at least one conduit adapted to transfer the fluid from the tank to the at least one battery cell, and a controller adapted to control the pump. The controller turns the pump on after an interval so that the fluid is transferred to the at least one battery cell.

7 Claims, 2 Drawing Sheets

SYSTEM AND METHOD FOR DELIVERING FLUID TO A BATTERY

FIELD OF THE INVENTION

The present invention relates to fluid electrolyte batteries, and, more particularly, to a system and method for delivering fluid to fluid electrolyte batteries.

BACKGROUND

A typical fluid electrolyte rechargeable battery, such as a flooded lead-acid battery, includes at least one battery cell with positive and negative electrodes and an electrolyte in which the electrodes are submerged. For example, a conventional 12-volt battery includes six 2-volt cells. Different battery applications may require different battery configurations. These types of batteries have a battery housing enclosing the battery cells that includes a port through which the electrolyte is supplied to the cells.

A battery of this type may be repeatedly discharged and charged to generate electrical energy, which makes the battery a suitable power source for many applications. For example, flooded lead-acid batteries may be used as power sources for electric vehicles, such as forklifts, golf cars, electric cars, and hybrid cars. These batteries are also used for emergency or standby power supplies, or to store power generated by photovoltaic systems.

For optimal performance, the electrodes are completely submerged in the electrolyte, which typically includes an aqueous acid solution. However, fluid is lost from the battery due to out-gassing during the charging of the battery, so replenishment of the fluid is necessary. For example, a fluid filing system may be connected to a fluid source every three to four weeks. However, one of the problems with this requirement is that a separate hook-up to a fluid source is required to replenish the fluid. Further, for optimal battery performance, it is necessary for a maintenance worker to perform this function at the correct point in the charging/discharging cycle of the battery before the fluid level is depleted too much. If this function is not performed at the correct time, battery life may be adversely affected.

SUMMARY

An embodiment of the present invention is directed to a system for delivering water to a fluid electrolyte battery string including at least one battery cell. Such a system includes a tank adapted to hold the fluid, at least one conduit adapted to transfer the fluid from the tank to the at least one battery cell, a pump adapted to pump the fluid through the at least one conduit; and a controller adapted to monitor the performance of the battery string and operate the pump based on the battery performance.

The controller may include a sensor adapted to determine battery string voltage. Here, the controller periodically determines battery voltage readings after an interval. When at least a first percentage of consecutive battery voltage readings are greater than a first threshold voltage, the controller turns on the pump after a first delay period.

In another embodiment, if less than a first percentage of battery voltage readings are greater than a first threshold voltage over a first measurement period, then, when at least a second percentage of consecutive battery voltage readings are greater than a second threshold voltage, the controller turns on the pump after a second delay period. Here, the absolute value of the second threshold voltage is less than the absolute value of the first threshold voltage.

In another embodiment, if less than a second percentage of battery voltage readings are greater than a second threshold voltage over a second measurement period, then the controller activates an alarm.

The controller may be further adapted to determine a back pressure at the pump. Here, the controller turns the pump off when the back pressure at the pump exceeds a threshold back pressure.

The controller and the pump may be powered by the battery. The controller may include a voltage regulator adapted to regulate a voltage supplied to the controller and the pump.

The controller may turn on the pump after a gassing phase of a charging cycle of the battery after the interval.

The interval may be about four weeks. The first measurement period and the second measurement period may be each about 10 days.

Another embodiment of the present invention is directed to a method of delivering water to a fluid electrolyte battery string comprising at least one battery cell. Such a method includes providing a tank adapted to hold the fluid, providing at least one conduit adapted to transfer the fluid from the tank to the at least one battery cell, providing a pump adapted to pump the fluid through the conduit when the pump is turned on, providing a controller adapted to monitor the performance of the battery string and operate the pump based on the battery performance, and turning on the pump after an interval.

The method may further include periodically determining battery voltage readings after the interval, and turning on the pump when at least a first percentage of consecutive battery voltage readings are greater than a first threshold voltage, wherein the pump is turned on after a first delay period.

The method may further include turning on the pump when at least a second percentage of consecutive battery voltage readings are greater than a second threshold voltage if less than the first percentage of consecutive battery voltage readings over a first measurement period are greater than the first threshold voltage. Here, the pump is turned on after a second delay period, and the absolute value of second threshold voltage is less than the absolute value of the first threshold voltage.

The method may further include activating an alarm if less than the second percentage of consecutive battery voltage readings are greater than the second threshold voltage over a second measurement period.

The method may further include turning off the pump when the back pressure at the pump exceeds a threshold back pressure.

The method may further include powering the controller and the pump via the battery.

The method may further include regulating a voltage supplied to the controller and the pump via the voltage regulator.

When compared to a conventional systems, the present invention provides a more reliable, convenient, and accurate method of delivering fluid to a fluid electrolyte battery.

BRIEF DESCRIPTION OF THE DRAWINGS

The above and other feature and advantages of the present invention will be better understood by reference to the following detailed description when considered in conjunction with the attached drawings, in which.

DETAILED DESCRIPTION

The present invention relates to a system and method for supplying fluid to a fluid electrolyte battery. One or more such batteries may be used in a battery string to power to a vehicle, such as a golf car. For example, the battery string may include one or more 12 to 60 Volt batteries arranged in series, in parallel, or in some combination of the two with each battery comprising one or more battery cells arranged in series, in parallel, or in some combination of the two.

Figure 1:
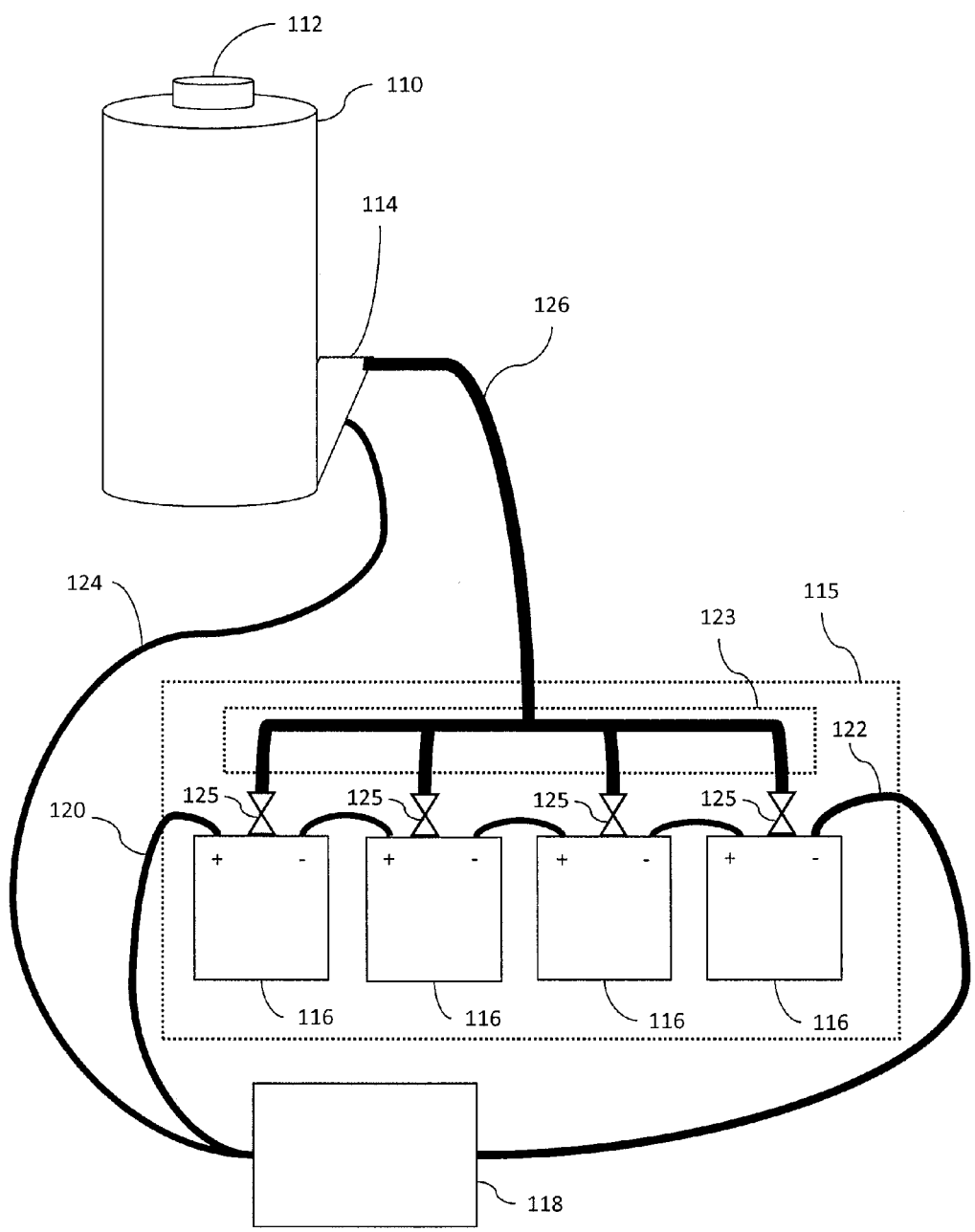
FIG. 1 is a schematic view of a system for delivering fluid to a battery according to one embodiment of the present invention.

As shown in FIG. 1, an embodiment of the present invention is directed to a system for delivering water to a fluid electrolyte battery 115 comprising four battery cells 116. Such a system includes a tank 110 adapted to hold the fluid, a pump 114 adapted to pump the fluid from the tank 110 when the pump 114 is turned on, at least one conduit 126 adapted to transfer the fluid from the tank 110 to the at least one battery cell 116, and a controller 118 adapted to control the pump 114. The controller 118 turns the pump 114 on after an interval so that the fluid is transferred to the battery cells 116. In an embodiment, the system runs on power from the battery 115.

Embodiments of the present invention include a controller that automatically provides a fluid from a tank to a battery after a suitable interval, for example, about a month, at a suitable point in the charging cycle of the battery, such as after the battery is fully charged. The method of providing the fluid includes having the controller monitor the voltage level of the battery. Once the controller determines that the battery is fully charged, for example, at a maximum voltage level, after a short delay period, the controller turns on a pump at the tank to pump fluid into the battery.

For example, in the embodiment shown in FIG. 1, the tank 110 adapted to hold the fluid, and, for a typical lead-acid battery, the fluid is water. The tank 110 includes an inlet to receive the fluid and a cap 112 that securely covers the inlet when the fluid is not being filled into the tank 110. The pump 114 pumps the fluid from the tank 110 through the conduit 126 to the battery cells 116. In embodiments of the invention with multiple batteries arranged in a battery string, the conduit 126 branches or divides so that the fluid is distributed to the multiple batteries.

The controller 118 controls the pump 114 via a control lead 124. Further, the controller 118 senses the voltage of the battery 115 to determine where the battery 115 is in the charging cycle. The controller 118 is electrically connected to the battery 115 via a first lead 120 attached to one pole of a battery cell 116 and a second lead 122 attached to an opposite pole. In embodiments with multiple batteries arranged in a battery string, the controller may be electrically connected to opposite poles of the battery string.

Figure 2:
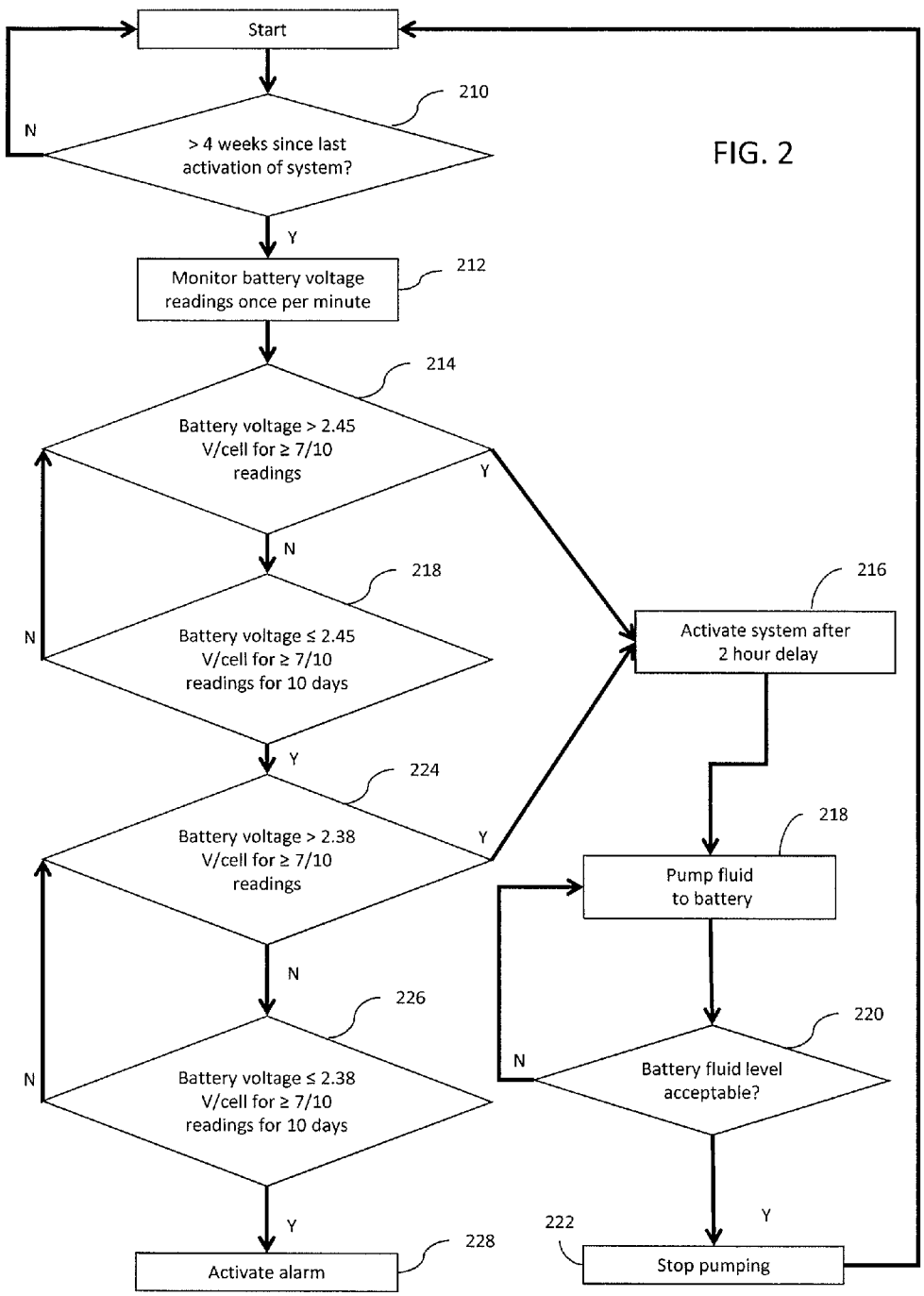
FIG. 2 is a flow chart showing a method for delivering fluid to a battery according to one embodiment of the present invention.

In an embodiment of the present invention shown in FIG. 2, a method of delivering fluid to the battery 115 uses the controller 118 to automatically determine the optimal time for delivering fluid to the battery. Here, the controller 118 initiates the fluid delivery at intervals, as shown in step 210. For example, the fluid delivery intervals may be about four weeks.

Further, the controller 118 determines when the battery 115 is at the end of the charge cycle (or gassing phase), since the optimal point for fluid delivery is after the battery is fully charged. To determine when the battery 115 is at the end of the charging cycle, the controller 118 periodically monitors battery voltage, for example, at one minute intervals, as shown in step 212. For instance, the controller 118 monitors (or learns) battery voltage by taking readings via a dip switch setting or monitors an open circuit voltage when the system is first installed and determines the battery string voltage.

Because a battery tends to be at its highest voltage after it has been fully charged, the controller determines whether the battery voltage readings are above a first threshold voltage (for example, about 2.45 V/cell), for at least seven out of ten readings, as shown in step 214. For example, the first threshold voltage would be 58.8 V on a 48 V nominal battery. If this condition is satisfied, the controller 118 will activate the system after about a two hour delay, as shown in step 216.

Here, multiple battery voltage readings are taken to accommodate line voltage variation, which may result from other chargers being plugged into the same circuit and causing a drop in the initial output current from the charger. In other words, if seven out of ten readings taken are above the threshold voltage (as described in the example above), then it is likely that the actual battery voltage is above the threshold voltage because this method compensates for variation in the battery voltage readings. However, other numbers of readings may be appropriate, such as three out of five readings, depending on the application.

The controller 118 then turns on the pump 114 to pump fluid (or water) to the battery 115, as shown in step 218. In an embodiment, the pump draws 2.4 A at 16 V from the battery. In one embodiment, pumping may continue for about three minutes. Further, each battery cell may be filled with fluid up to 1.25+/−0.13 inches from a top surface of the vent in the battery cell.

When the fluid level in the battery 115 is acceptable, step 220, the pump 114 stops pumping fluid, step 222.

In an embodiment of the present invention, a manifold 123 couples the conduit 126 from the pump 114 to the battery cells 116 of the battery 115. For example, the manifold 123 may be similar to the manifold taught in U.S. patent application Ser. No. 12/346,105, entitled LOW PROFILE MANIFOLD FOR SINGLE POINT WATERING SYSTEMS FOR LEAD-ACID BATTERIES (hereinafter "the '105 application") filed in the United States Patent and Trademark Office on Dec. 30, 2008, the entire content of which is incorporated herein by reference.

The manifold 123 may be attached to one or more battery cells 116, for example, to four battery cells. Here, the manifold 123 attaches to battery cell watering vents. The conduit 126 attaches to the manifold 123, for example, at the top of the manifold 123, so that the fluid is delivered to the manifold 123. The fluid travels through channels in the manifold 123 to each battery cell 116 coupled to the manifold 123 via a valve 125. A float, or shut-off mechanism is used to close the valve 125 coupled to each battery cell 116. One of ordinary skill in the art will appreciate that various types of shut-off mechanisms may be utilized. For example, the shut-off mechanism may be like the float described in the '105 application. The valves 125 may be closed independently since each battery cell 116 is likely to require different amounts of fluid. In other words, the fluid may evaporate from each battery cell 116 at a different rate, usually due to the position of each battery cell 116 with respect to the other battery cells 116. For example, battery cells 116 positioned between other battery cells 116 may lose fluid at a faster rate.

Further, there is no siphoning between battery cells 116. In other words, fluid does not flow from one battery cell 116 to another battery cell 116. If a battery cell 116 does not need water, the float will close the valve 125 and fluid will not enter the battery cell 116.

Additionally, there is at least one gas vent on the each battery 115 to allow gases to escape from the battery. For example, during charging and discharging of the battery cell 116 gases may be generated and the gases must be allowed to escape so that pressure does not build up in the battery cell 116.

In an embodiment of the present invention, the controller 118 turns on the pump 114 for a specified duration. The duration may be set for a suitable length, such as three to five minutes, and the duration may be adjustable.

For example, the duration may be set for a duration that would be the longest estimated duration that would be required to fill the battery cell 116. In other words, this duration would be a worst-case scenario, where the battery cell 116 has been maximally depleted of fluid.

Once the battery cell 116 has been filled with fluid to a suitable level, the valve 125 delivering fluid to the battery cell 116 closes so that no more fluid enters the battery cell 116. However, as is understood by those of ordinary skill in the art, the pump 114 may be designed to continue to attempt to pump, or operate in a stalled condition, even though no fluid is being moved since the valve 125 is closed. Therefore, the pump 114 continues to run, but no additional fluid is moved to the battery cells 116.

In another embodiment of the present invention, the controller 118 detects the electrical current to the pump 114. In a stalled pump condition, the current to the pump 114 sharply increases. Therefore, when the controller 118 detects that the pump 114 is in a stalled condition due to the sharp increase in current, the controller 118 turns the pump 114 off.

In another embodiment, the controller 118 includes a sensor that monitors back pressure at the pump 114 and determines whether back pressure at the pump exceeds a threshold pressure. Once the back pressure exceeds a threshold pressure, the battery has received the correct amount of fluid, and the controller 118 stops the pumping by turning the pump 114 off.

If the battery voltage readings are not above the first threshold voltage (for example, 2.45 V/cell) for at least seven out of ten readings, the controller 118 continues to monitor battery voltage readings for ten days, as shown in step 218.

After ten days, if the battery voltage for at least seven out of ten readings does not exceed the first threshold voltage, then the threshold voltage will be reduced to a second threshold voltage (for example, about 2.38 V/cell). Because full-charge battery voltage decreases as batteries age, a full-charge battery voltage exceeding the first threshold voltage may not be possible for older batteries. The batteries may only be capable of being charged to a voltage lower than the first threshold voltage, even when fully charged. Therefore, the threshold voltage is reduced to the second lower threshold voltage, which is a voltage level that older batteries may be charged to when fully charged.

The controller 118 continues to monitor the battery voltage readings, as shown in step 224. If seven out of ten consecutive readings are above the second threshold voltage, the controller 118 will activate the watering system after a two hour delay, as shown in steps 216, 218, 220, and 222, and described above.

If seven out of ten consecutive readings are not above the second threshold voltage, the controller 118 continues to monitor the battery voltage readings for an additional ten days, as shown in step 226.

After the additional ten days, if the battery voltage is not above the second threshold voltage for at least seven out of ten readings, the controller 118 will activate an alarm, as shown in step 228. For example, the alarm may be a visual signal, such as an LED, and/or an audible alarm. Here, the battery voltage may not be above the second threshold voltage for at least seven out of ten readings because there is a malfunction in the battery charging system, the controller 118, or the battery, or the system has been stored for the winter and has been accidentally left on. However, the controller 118 will continue to monitor battery voltage for an opportunity to activate the system.

One of ordinary skill in the art will appreciate that other threshold voltages, numbers of readings, and numbers of days for monitoring may be suitable, depending on the application, and that the values described above merely represent the concept of the invention.

In embodiments of the present invention, the controller logic of the controller 118 allows the system to function independently of the charging system used in the vehicle or other application with respect to the activation of fluid delivery, while the battery provides power to the controller 118 and the pump 114. For example, a 48 V battery is typical for a typical golf car. However, since other applications may require a 12 V, 24 V, 36 V, 60 V, or 72 V system with two or more batteries arranged in a battery string, the controller 118 may include a voltage regulator to regulate the voltage used to power the controller 118 and pump 114 so that the controller 118 and pump 114 are operable with 12 V to 72 V batteries. For example, the controller 118 may determine the total voltage of the system by the user selecting one or more appropriate dip switches or by recording the open-circuit voltage at the initial activation of the system.

In other embodiments of the present invention, the controller 118 may be integrated into the battery charging system. Further, the system may have a low parasitic load of less than about 10 mA while the controller 118 is monitoring the system. When delivering fluid to the battery 115, the current may be approximately 2.4 A at 16 V for approximately three minutes. Also, the controller 118 may be capable of being turned off or disconnected from the battery 115.

In another embodiment, the controller 118 may indicate to the user when the tank 110 is near empty by an alarm, such as a flashing LED. Further, electronic circuits, such as those on the controller 118 or the pump 114, may be potted to avoid exposure to water, sulfuric acid, and fertilizers. For example, the circuit boards may be epoxy-potted to protect them from corrosive environments, depending on the application.

In an embodiment, the inlet may include a strainer for preventing debris from entering the tank 110 when fluid is being filled into the tank 110. Also, the tank 110 may include a vent to the atmosphere for venting the battery gas generated during operation and charging of the battery 115, which may be located in the cap 112.

Further, the tank 110 must be capable of holding a suitable amount of fluid. In some embodiments, the tank 110 must be capable of holding a sufficient amount of fluid so that the tank only needs to be filled two to three times a year. This amount can be calculated from the expected fluid loss from the battery 115 due to electrolysis during charging and evaporation. However, depending on the application, the tank 110 size may be increased to reduce the frequency with which the tank 110 must be refilled with fluid. For example, in some applications, the tank 110 may hold as much as five to eight gallons of fluid.

Additionally, the tank may be at a similar level to the battery to minimize pressure or prevent water from being forced into the battery.

The tank 110 is formed of a suitable material, such as plastic. Further, the material forming the tank 110 may be UV light stabilized material so that the material does not break down under extended UV light exposure and/or does not transmit UV light. In some embodiments, the material forming the tank 110 is translucent enough to allow the water level in the tank 110 to be viewed through the tank 110. In other embodiments, the material forming the tank 110 is black so that light is prevented from passing into the tank 110. In still other embodiments, the material forming the tank 110 may be black with a portion that is translucent.

In another embodiment of the present invention, the tank 110 includes a non-mechanical fluid level indicator that indicates when the tank 110 needs to be refilled. For example, a white indicator means that the battery 115 needs fluid and a black indicator means that the battery has enough fluid.

In embodiments of the present invention, the tank 110 is formed such that fluid does not escape from the tank 110 when the tank 110 is filled to a maximum level and subjected to a tilt angle of 23.5 degrees. For example, when the tank 110 is located on a golf car, the golf car may be utilized on uneven surfaces so that the golf car, and thus the tank 110, may be tilted, and the tank 110 should be formed so that fluid does not spill out of the tank 110 when the tank 110 is tilted.

Further, the tank 110 may be formed to be capable of withstanding freezing of the fluid within the tank 110 when filled to a maximum level marking on the tank 110. For example, when the tank 110 is located on a golf car, the golf car may encounter environmental conditions where the ambient temperature is below the freezing point of water (32 degrees F.), and fluid in the tank 110 may freeze and, subsequently, expand. Here, the tank 110 should be formed such that the tank 110 does not crack or break due to the expansion of frozen fluid.

The tank 110 may be integrated into the vehicle. For example, the tank 110 may be integrated into the frame or structure of a golf car.

In embodiments of the present invention, the pump 114, for example, an electric pump, provides water at a suitable pressure to produce a suitable flow rate. For example, the pressure may be between about 10 and about 30 psi, and the flow rate may be between about 2 to about 5 gallons per minute.

The conduit 126 may be any suitable type of conduit, such as snap-in tubing (tubing that is connected with snap-fit connectors).

In the embodiment shown in FIG. 1, the battery cells 116 are serially connected so that the first lead 120 is connected to one pole of a battery cell 116 at one end of the battery 115 and the second lead 122 is connected to the opposite pole of a battery cell 116 at the opposite end. One of ordinary skill in the art will appreciate that the battery cells 116 can be connected in other configurations, such as in parallel, or in series and parallel, and that the first and second leads 120 and 122 may be attached to the battery 115 in such a way as to monitor the voltage of the battery. For example, the first and second leads 120 and 122 may be attached at the same locations where the battery 115 is connected to a load.

In other embodiments of the present invention, a manual activation switch may be included to activate the watering system manually.

In an embodiment of the present invention, the system should be able to withstand an 8-10 kPa pressure wash at about 3 inches for about 5 seconds at about a 3 gallon/minute flow rate without physical damage and shall remain functional. Further, the system should be able to operate in an environment where sulfuric acid is present, such as exposure to dilute sulfuric acid (40% concentration by weight).

Embodiments of the present invention may include internal and/or external flame arrestors for safety purposes. For example, flame arrestors may prevent sparks or flames from entering the battery if a spark occurs external to the battery.

In embodiments of the present invention, typical operating conditions include operating temperatures from about 0 degrees C. to about 50 degrees C., and storage conditions may range from about −40 degrees C. to about 60 degrees C. with humidity ranging from about 5% non-condensing to 100% relative humidity.

In embodiments of the present invention, an anti-algae tablet may be added to the tank 110 periodically to prevent algae growth in the tank 110.

In other embodiments, the system may be installed on an existing battery or may be used in stationary applications, such as batteries used to store energy from renewable sources.

According to embodiments of the present invention, a user only needs put water in the tank two to three times a year. Further, fluid is properly delivered to the battery in a timely manner so that electrolyte levels do not fall far enough to expose the electrodes, which is a common cause of premature failure for these types of batteries. Therefore, maintenance time and labor costs are reduced, and costs due to premature battery failure are also likely reduced.

While the present invention has been illustrated and described with reference to certain exemplary embodiments, those of ordinary skill in the art would appreciate that various modifications and changes can be made to the described embodiments without departing from the spirit and scope of the present invention, as defined in the following claims.

What is claimed is:

1. A method of delivering a fluid to a fluid electrolyte rechargeable battery string comprising at least one battery cell, the method comprising:
   providing a tank adapted to hold the fluid;
   providing at least one conduit adapted to transfer the fluid through the conduit to the at least one battery cell;
   providing a pump adapted to pump the fluid from the tank when the pump is turned on;
   providing a controller adapted to monitor the performance of the battery string by:
   a. periodically taking battery voltage readings during a measurement period after an interval of time;
   b. determining if at least a first predetermined percentage of the battery voltage readings are greater than a first threshold voltage;
   c. initiating a first delay if the first predetermined percentage of the battery voltage readings are greater than the first threshold voltage;
   d. repeating a through c if the first predetermined percentage of the battery voltage readings are not greater than the threshold voltage;
   e. determining if a second predetermined percentage of the battery voltage readings are greater than a second threshold voltage if steps a through c have been repeated a predetermined number of times without initiating the first delay, wherein the second threshold voltage is less than the first threshold voltage; and
   f. initiating a second delay if the second predetermined percentage of the battery voltage readings are greater than the second threshold voltage; and
   turning on the pump after the first delay or the second delay.

2. The method of claim 1, the method further comprising activating an alarm if the second percentage of the voltage readings are not greater than the second threshold voltage.

3. The method of claim 1, wherein the controller is further adapted to determine a back pressure at the pump, and the method further comprises turning off the pump when the back pressure at the pump exceeds a threshold back pressure.

4. The method of claim 1, the method further comprising powering the controller and the pump via the battery.

5. The method of claim 1, wherein the controller further comprises a voltage regulator, and the method further comprises regulating a voltage supplied to the controller and the pump via the voltage regulator.

6. The method of claim 1, wherein the interval of time is four weeks.

7. The method of claim 1, wherein the measurement period is 10 days.

* * * * *